Patented Nov. 8, 1932

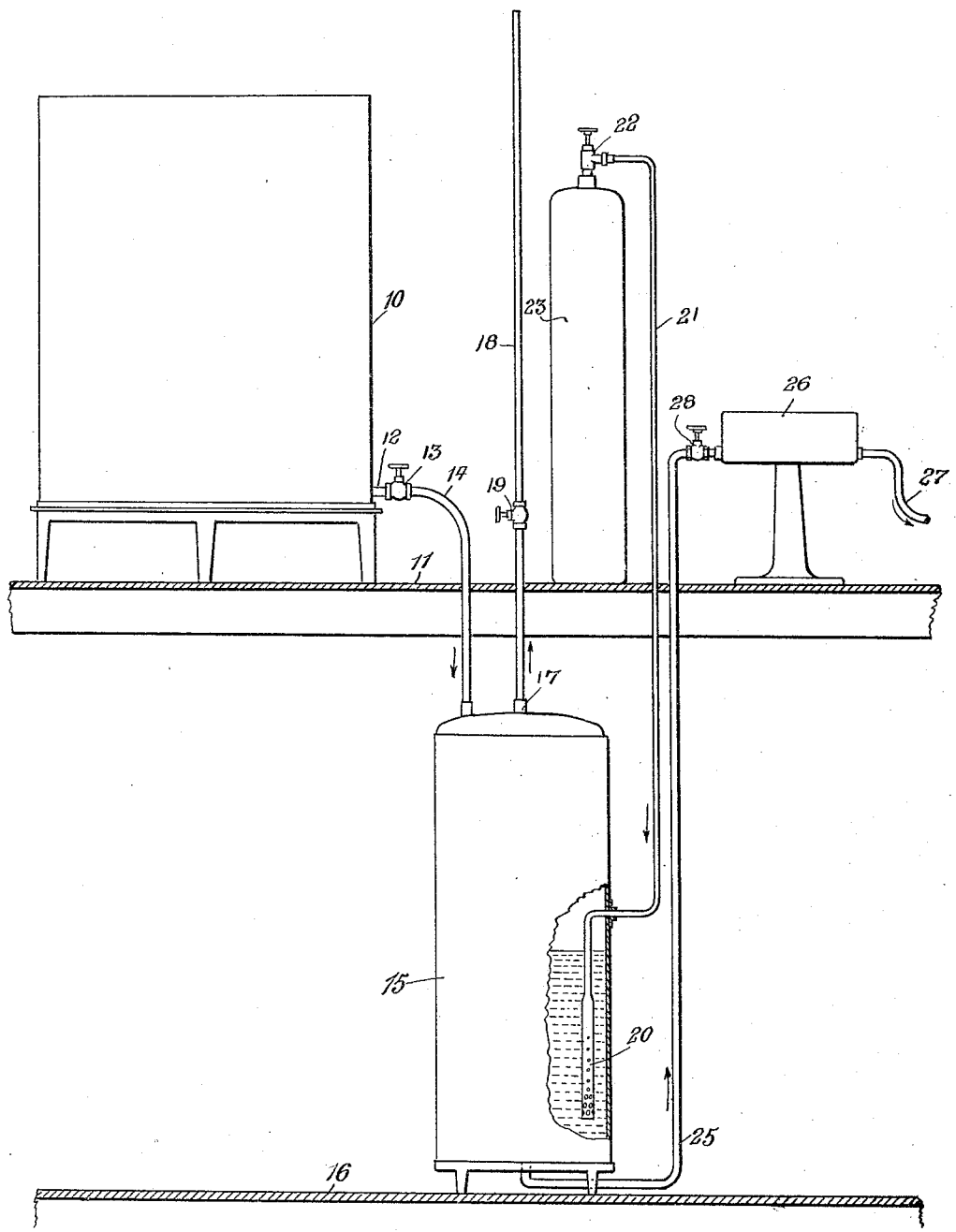

1,887,297

UNITED STATES PATENT OFFICE

CHARLES FRANK, OF BROOKLYN, NEW YORK

APPARATUS FOR AND METHOD OF STERILIZING

Application filed April 5, 1929. Serial No. 352,875.

This invention relates to an apparatus for and method of sterilizing.

The invention particularly relates to the sterilization of liquids by a gaseous fluid. In the specific embodiment of the invention herein disclosed the method and apparatus are utilized for the sterilization of sugar sirups by carbon dioxid gas.

It is among the objects of the present invention to provide a method of and apparatus for sterilizing sirups, by subjecting the sirup to a gaseous sterilizing agent.

It is a further object of the present invention to provide a method of and apparatus for sterilizing sirups while in passage from a mixing tank to a filter.

Broadly, the object of the present invention is to provide a method of and apparatus for sterilizing materials.

Numerous other objects and features of the present invention will be apparent from a consideration of the following specification taken in conjunction with the accompanying drawing, in which The figure is a diagrammatic illustration of the apparatus forming part of the present invention.

Referring more particularly to the drawing, it will be understood that the apparatus illustrated is particularly designed for the sterilization of sugar sirup such as used in the manufacture of beverages or the like. It will be understood, however, that both the method and apparatus here disclosed are adapted for use in conjunction with the sterilization of other materials.

In the drawing, the numeral 10 indicates a mixing tank in which the material to be sterilized may be mixed. The sugar and suitable solvent, such as water, are placed within the mixing tank and mixed in any suitable manner. The mixing tank 10 is positioned upon an upper floor 11 or equivalent raised supporting structure.

After suitable mixing the fluid material from the tank 10 is discharged through a discharge tube 12, suitably controlled by a valve 13, and passes through a pipe 14 into the sterilizing tank 15. The sterilizing tank 15 is preferably positioned on a lower floor 16 or equivalent supporting structure in a manner such that the fluid may feed by gravity from the tank 10 to the tank 15. The pipe 14 is associated with the upper end of the tank 15, and adjacent to it a vent 17 is provided associated with a vent tube 18 which is controlled by a valve 19, the arrangement being such that as the valve 19 is opened, the pressure of the tank 15 is relieved and the fluid moisture may pass from the tank 10 through the pipe 14 and into the sterilizing tank 15.

For sterilizing the fluid in the tank 15, a perforated gas supply tube 20 is provided, which extends preferably from approximately the center of the tank 15 downwardly. The tube is suitably apertured, the apertures increasing toward the bottom of the tube, thus permitting the escape of gas from the tube to the fluid. For supplying the tube 20 with suitable sterilizing gas, a supply pipe 21 is provided, coupled through the walls of the tank 15, with the tube 20. The upper end of the pipe 21 is associated with a valve structure 22, which is mounted upon the top of a suitable gas storage cylinder 23, the arrangement being such that gas may be discharged from the cylinder 23 by opening the valve 22, the gas passing through the cylinder through the pipe 21 to the tube 20, through which it escapes to the fluid within the tank 15.

For discharging the sterilized fluid from the tank 15, an outlet tube 25 is provided which is preferably associated with the bottom of the tank 15 and extends upwardly to the upper floor 11 upon which is supported a suitable filter 26, with which the tube 25 is associated. The fluid after passing through the filter 26 is discharged to a suitable associated apparatus through an outlet pipe 27.

From the foregoing it will readily be seen that the gas from the cylinder 23 acts jointly as a sterilizing agent and provides a pressure for forcing the fluid through the outlet pipe 25 to the filter 26.

In the operation of the present apparatus, a suitable fluid mixture is provided in the mixing tank 10, and when ready for sterilization is admitted to the tank 15 through the pipe 14 by the opening of the valve 13.

As the fluid enters the tank 15, the air or gas within the tank is compressed and the vent valve 19 is opened to permit the gas to escape, thus permitting the filling of the tank from the tank 10.

When the tank is partially filled, the valve 19 is closed and the valve 22 is opened, thus admitting a sterilizing gas from the cylinder 23 through the pipe 21, from which it passes through the tube 20 and is discharged therefrom to the fluid within the tank. The fluid is retained within the tank the desired length of time by the control of a valve 28 associated with the filter, which when opened permits the gas pressure in the tank 15 to force the fluid through the discharge pipe 25 to the filter 26.

From the foregoing it will readily be seen by suitably controlling the valves 13, 22 and 28, a process may be carried out whereby the fluid passes from the tank 10 through the sterilizing chamber and to the filter 26. It will be understood that the structural details presented may be readily changed and modified without departing from the spirit or scope of the invention as outlined in the appended claims.

As an illustration of the method of the present invention, the use of carbon dioxid gas for the sterilization of sugar sirup is discussed. It will be understood that the method of the present invention is, however, not confined to the specific materials herein mentioned and that other gases for the sterilization of other materials may be used without departing from the spirit or scope of the present invention.

In the sterilization of sugar sirup, the sugar and a suitable solvent are placed within the tank 10 and mixed in any desired manner until the proper characteristics of the mixture are obtained. The mixture is then passed to the sterilizing chamber whereby it is subjected to carbon dioxid gas under pressure. The action of the carbon dioxid gas upon the mixture is such that bacteria or the like are killed by contact with the gas. After the desired time interval which is determined by the characteristics of the fluid in the gas, the sterilized fluid is passed through a filter which removes foreign matter and the filtered and sterilized fluid is ready for use.

From the foregoing it will be readily seen that the present invention provides a novel and improved method of and apparatus for sterilizing materials.

It will be understood that numerous changes and modifications and the full use of equivalents may be resorted to in the accomplishment of the present invention without departing from the spirit or scope of the appended claims.

What is claimed is:

1. An apparatus for sterilizing a liquid by carbon dioxide gas under pressure comprising a sterilizing chamber having a liquid inlet at the top and a liquid outlet at the bottom, a liquid supply tank positioned above said chamber, a pipe leading from near the bottom of said tank to said liquid inlet, a valve interposed in said pipe for regulating the flow of liquid therethrough, a vent positioned at the top of said chamber for venting the used gas, a vent pipe leading from said vent, said vent pipe being provided with a valve for regulating the flow through said vent pipe, means including a foraminous pipe for discharging carbon dioxide gas under pressure into said chamber, said foraminous pipe being positioned near the bottom of said chamber whereby the gas will pass through the liquid in said chamber before it reaches said vent, a filter positioned approximately at the same level as said liquid supply tank, and a pipe leading from said outlet to said filter, said pipe being provided with a valve for controlling the flow of liquid into said filter.

2. An apparatus for sterilizing liquid sugar syrups by carbon dioxide gas under pressure comprising a sterilizing tank having a liquid inlet at the top, a liquid outlet at the bottom, means at the top for venting the used gas from said chamber, a liquid supply tank arranged above said sterilizing chamber, tubular means for connecting said tank with said inlet, means for supplying gas under pressure to said chamber near the bottom thereof, said means including a foraminous pipe arranged near the bottom of the chamber, a supply pipe leading from the foraminous pipe to a point exterior of the chamber, and a tank under pressure for supplying gas under pressure to said supply pipe whereby as said liquid enters at the top of said chamber the liquid must pass through the gas before it can reach the lower part of the chamber, and means connected with said outlet for directing the sterilized liquid to a discharge point, said means including a discharge pipe and a valve, said valve acting to permit the liquid to flow off continuously or from time to time.

Signed at Brooklyn in the county of Kings and State of New York this 2d day of April A. D. one thousand nine hundred and twenty-nine.

CHARLES FRANK.